(12) United States Patent
Quade

(10) Patent No.: US 8,359,012 B2
(45) Date of Patent: Jan. 22, 2013

(54) LOCATION BASED SERVICE VOICE BLOGGING SYSTEM FOR LAND MOBILE NETWORKS

(75) Inventor: Michael Quade, Bonn (DE)

(73) Assignee: Deutsche Telekom AG, Bonn (DE)

(*) Notice: Subject to any disclaimer, the term of this patent is extended or adjusted under 35 U.S.C. 154(b) by 0 days.

(21) Appl. No.: 12/812,564

(22) PCT Filed: Sep. 18, 2009

(86) PCT No.: PCT/EP2009/006757
§ 371 (c)(1),
(2), (4) Date: Sep. 18, 2010

(87) PCT Pub. No.: WO2010/049039
PCT Pub. Date: May 6, 2010

(65) Prior Publication Data
US 2011/0294468 A1 Dec. 1, 2011

(30) Foreign Application Priority Data
Oct. 30, 2008 (DE) .................. 10 2008 053 887

(51) Int. Cl.
*H04M 1/725* (2006.01)
(52) U.S. Cl. .................. 455/412.1; 455/403; 455/412.2
(58) Field of Classification Search .................. 455/403, 455/404.2, 412.1–413, 414.1–414.2, 456.1–457
See application file for complete search history.

(56) References Cited

U.S. PATENT DOCUMENTS

| | | | |
|---|---|---|---|
| 7,450,954 B2 * | 11/2008 | Randall | 455/456.1 |
| 2005/0064852 A1 | 3/2005 | Baldursson | |
| 2005/0278371 A1 | 12/2005 | Funk | |
| 2006/0168627 A1 * | 7/2006 | Zeinstra et al. | 725/75 |
| 2006/0291629 A1 | 12/2006 | Esh | |
| 2008/0057988 A1 | 3/2008 | Lovell | |
| 2008/0070588 A1 | 3/2008 | Morin | |
| 2008/0132251 A1 | 6/2008 | Altman | |
| 2010/0228630 A1 * | 9/2010 | Mikkelsen et al. | 705/14.66 |

OTHER PUBLICATIONS

S. Gaonkar, "Micro-Blog: sharing and querying content through mobile phones and social participation" MobiSys '08 ISBN: 978-1-60558-139-2, Mar. 2008.

* cited by examiner

*Primary Examiner* — Ajit Patel
(74) *Attorney, Agent, or Firm* — Andrew Wilford

(57) ABSTRACT

A blogging system is operated on a server connected to a cellular land mobile network where a media object for the blogging system is transmitted from a first cellular terminal over the land mobile network to the server and stored in a database connected to the server, and the media object can be retrieved from a second cellular terminal. A first parameter characterizing the geographical location of the first cellular terminal is determined and linked to the media object, and a second parameter characterizing the geographical location of the second cellular terminal is determined and compared to the first parameter. The media object is made available to the second cellular terminal only when the geographical position of the first terminal as characterized by the first parameter does not exceed a certain distance from the geographical location of the second cellular terminal as characterized by the second parameter.

11 Claims, 1 Drawing Sheet

LOCATION BASED SERVICE VOICE BLOGGING SYSTEM FOR LAND MOBILE NETWORKS

FIELD OF THE INVENTION

This invention relates to a process for operating an information platform, especially a location-based service blogging system, on a server which is connected to a land mobile network, from a first cellular terminal over the land mobile network a media object for the information platform being transmitted to the server and stored in a memory connected to the server, and the media object can be retrieved from a second cellular terminal. Furthermore this invention relates to a system for operating such an information platform, especially a location-based service blogging system for land mobile networks.

BACKGROUND OF THE INVENTION

For the exchange of information Internet-based and thus publicly accessible and understandable diaries or journals are known which are routed on a server which is connected to the Internet, and can be displayed in the web page of a web browser. These diaries or journals constitute information platforms with entries which are generally chronologically sorted in a list. This information platform is also called a web blog or blog for short. Those individuals who fill a blog with entries are called bloggers. A blog is a medium which is simple to operate for publication of information, opinions, thoughts or experiences in the form of short texts which are not limited to diaries in terms of content. Placing text entries in a blog is called blogging.

These blogging systems are generally executed as Internet applications and can be reached by computer. They make it possible for individuals to express themselves and to easily relay these expressions to third parties. The users of these blogging systems, i.e. the bloggers, constitute a community or group of users, which automatically forms by using the blog and which is always growing. The members of a community are thus linked by the use of the blogging system or a certain blog which is generally oriented to a specific topic.

To date it has not been possible for users of cellular telephones to use these blogging systems, since communication in land mobile networks preferably takes place by voice. So far it has only been possible for Internet-capable cellular telephones to participate in blogging systems. But they are exclusively text-based. On an Internet-capable cellphone texts for a blog can be written and stored in it and texts can be retrieved from it. Here the blogger also merges the topic of the corresponding blog.

OBJECT OF THE INVENTION

The object of this invention is to make available a system for operating an information platform, especially a blogging system, for cellular subscribers and a corresponding method for operating the information platform which enables automatic formation of local communities.

SUMMARY OF THE INVENTION

In the proposed process for operating an information platform, especially a blogging system, on a server which is connected to a land mobile network, a media object for the information platform being transmitted to the server from a first cellular terminal to the server over the land mobile network and being stored in a memory which is connected to the server, and the media object being retrievable by the second cellular terminal, it is provided as claimed in the invention that a parameter which characterizes the geographical location of the first cellular terminal is determined and is linked to the media object. The media object is thus stored on the information platform together with the geographical location of the first cellular terminal and can be retrieved from there.

By determining the geographical location of the first cellular terminal or of the cellular subscriber who is using the first cellular terminal, a media object sent from the latter to the information platform can be linked to a new geographical origin. If this linkage takes place, a geographical location is uniquely assigned to the media object. This assignment enables formation of a location-based community or group of users, whose members share the fact for example that they are located within a certain radius around a geographical point. If a first cellular subscriber would like to send information, for example about a local event which is currently underway or a future event or a commentary on a noteworthy geographic site over his first cellular terminal to the cellular subscribers or cellular terminals which are located geographically in the vicinity, he can send from his mobile terminal a media object to the information platform or to the blogging system which can then be manually or automatically retrieved by other cellular subscribers, especially those who are located in the vicinity, or can be automatically offered to them.

The media object can preferably be a voice message which is transmitted by the first cellular terminal to the server. This ensures the use of the information platform by means of any commercial cellular terminal since voice in land mobile networks is the elementary communications medium. Both the transmission of the voice message to the information platform and also its retrieval are possible by means of any cellular terminal. Alternatively the media object can also be a photo or a video which has been recorded by the first cellular terminal and which can provide information about a geographic location or a local event.

Preferably a cellular terminal can be connected to the server by dialing a subscriber number assigned to the server. Assignment of a subscriber number to the server ensures especially simple and customer-friendly connection to the information platform.

In one advantageous configuration of the invention, after dialing the server an identity interrogation can take place which can be confirmed by input of the user identification. This ensures that only authorized users can leave media objects on the information platform. The system can thus undertake assignment of a transmitted media object to a user. This assignment makes it possible to block a user if a media object sent by him violates public order or good manners. Furthermore it is however also possible for other users to be able to have the contributions of a certain blogger retrieved and displayed in a dedicated manner.

The information platform can preferably be controlled such that the server is caused to perform a certain action by actuation of a button of one of the cellular terminals. Control of the information platform by means of button actuation is an especially simple and comfortable manner of operation. The server recognizes in this case which button of a cellular terminal has been actuated and executes the action assigned to this button, for example recording of a voice message. Control can take place for example by a DTMF (dual tone multiple frequency) method. This control by means of button actuation ensures that the server correctly understands the action desired by the cellular subscriber and executes it accordingly. In contrast, this is often not the case for voice-controlled systems.

Alternatively a voice dialog system can be operated on the server and can ensure a high degree of recognition for transmitted voice commands by an especially high quality of voice analysis. A voice dialog system simplifies operating the information platform since no manual operating steps need be undertaken on the cellular terminal and only acoustic commands are transmitted to the information platform.

For transmission of the media object preferably voice-over-IP (Internet telephony) can be used. In this Internet protocol which is intended for transmission of voice, it is enabled that the Internet can be used for transmission of the media object. The server is then preferably connected to the Internet so that access to the server over the Internet can be carried out likewise by the computer user. The use of voice-over-IP dictates a software application on the terminal side. To avoid a separate application, another transmission standard can be alternatively used, for example GSM (Global System for Mobile Communication), GSM 1800, UMTS (Universal Mobile Telecommunications System), LTE (Long Term Evolution), MiMAX (Worldwide Interoperability for Microwave Access), TETRA (Terrestrial Trunked Radio) or another Japanese or US standard. This ensures that the process as claimed in the invention with all available cellular terminals works without an additional application.

In one advantageous development of the process as claimed in the invention, a second parameter which characterizes the geographical location of the second cellular terminal is determined and compared to the first parameter when the second cellular terminal retrieves a possible media object or one is automatically offered to it, the media object being made available to the second cellular terminal only when the geographical position which characterizes the first parameter does not exceed a certain distance to the geographical location of the second cellular terminal and/or specific filter criteria are satisfied, for example certain interests of the cellular subscriber of the second cellular terminal. The determination of the geographical location of the cellular terminal or the second cellular subscriber enables determination of the distance to the location at which the first cellular subscriber has transmitted the media object to the information platform. Based on this distance it can be determined by the server whether the second cellular subscriber belongs to the local community or not. If the fixed distance exceeds a certain given value, the second cellular subscriber does not belong to the community. The media object left by the first cellular subscriber is thus not made available to him. Viewed differently, the media object for the second cellular subscriber due to the overly great distance to the geographical location to which the media object is linked can also be of no interest, since it is located too far from the location or the event which characterizes the media object.

Preferably the determination of the geographical location of the second cellular terminal can take place directly in the connection of the second cellular terminal to the server which has been initiated by the terminal. If the second cellular subscriber wants to connect to the information platform in order to acquire access to stored media objects, by determining the geographical location of the cellular terminal of the corresponding cellular subscriber it can be directly determined which media objects are of interest to him. Media objects of no interest can thus be filtered out directly. As soon as the geographical location of the second cellular terminal is known, the media object(s) nearest in terms of space can be determined, for example by determining the names of roads and/or locales by an application which can determine these names for a geographical position by means of a digital map.

Alternatively or in combination with determining the geographical location of the second cellular terminal in a connection to the server initiated by the cellular subscriber, the location can also be continuously determined, especially at regular intervals. This can take place on the server side by the land mobile network or by the second cellular terminal itself. For the first case then the location is known to the server so that on its basis a media object is automatically offered to the second cellular terminal when the second cellular terminal approaches the geographical position to which a certain media object is linked and/or certain filter criteria are satisfied. In particular, the media object can be offered to the second cellular terminal when the distance between its geographical location and the geographical position which characterizes the parameter linked to the media object, corresponds to a predetermined value or falls below it. Falling below the value means that the cellular terminal is entering a circumference around the geographical position which is fixed by the value. For the latter case, in the cellular terminal a software application can be used which cyclically asks for media objects at the server so that the second cellular terminal is always informed about the current media contributions of the local community. Cyclic interrogation for media contributions can consequently take place automatically, both its being possible that the second terminal first determines its geographical location itself and then connects to the server, or first connects automatically to the server and the location is determined afterward on the network side.

Automatic offering of the media object can preferably take place by the second cellular terminal being called or an electronic message, for example a text message (SMS) or a multimedia message (MMS), being sent to it, to which message there can be a reaction by manual calling of the server. Offering takes place preferably when the distance between its location and the geographical position to which the media object is linked corresponds to a predetermined value or falls below it, or specific filter criteria, for example certain interests of the cellular subscriber, are satisfied. The second cellular terminal by automatic offering acquires the information that it is now located in a local community and in this community informative media contributions, especially about the region, are available or can be obtained.

Connecting between the second cellular terminal and the server can consequently take place in the following four ways which are possible both alternatively or in combination: automatic calling of the second cellular terminal by the server when certain conditions are met; manual calling of the server by the second cellular terminal; automatic sending of a message to the second cellular terminal by the server when certain conditions are satisfied, and subsequent manual calling of the server by the second cellular terminal; automatic cyclic calling of the server by the second cellular terminal.

Preferably the determined parameters can each be identifiers of a cell. In cellular land mobile networks identifiers are assigned to the individual cells and are evaluated in the process of the cellular terminal checking into the land mobile network, especially in the authentication and authorization processes necessary for this purpose. Using these cell identifiers therefore the geographical position can be easily and quickly linked to the media object. But since the cell defines a geographical area in space, the geographical origin of a media object provided with a cell identifier is comparatively imprecise. Alternatively the parameters can therefore be geographical longitude and latitude information. Thus a more accurate geographical position can be assigned to the media object.

Determination of the geographical position of the first or second cellular terminal as a parameter which can be specified in longitude and latitude information can be done for example by means of a triangulation process or a global positioning location process. In a triangulation process the land mobile network determines the geographical position of the corresponding cellular terminal. In this case a media object transmitted by the cellular terminal to the server can be provided by the land mobile network with the determined geographical position. The land mobile network can recognize by the choice of the subscriber number assigned to the server that the cellular terminal would like to set up a connection to the information platform and thereupon can attach the determined position to the media object which is in transmission, i.e. attach the data which represent the identifier to the data forming the media object, and send the position beforehand or afterward to the server.

In a global positioning location process the cellular terminal determines its geographic position itself, for example by means of an integrated GPS receiver, and sends both the media object and also the determined geographical position linked beforehand to the media object to the server.

If a corresponding media object is received by the server and stored in the database connected to it, it can be selected by a second cellular terminal and transmitted by the server to it. The information platform in this connection constitutes an agent of management which manages and coordinates access to a database.

As claimed in the invention a system is furthermore proposed for operating an information platform, especially a blogging system, on a server, comprising this server which is connected to the cellular land mobile network, a first cellular terminal from which a media object for the information platform can be transmitted over the land mobile network to the server and can be stored in a database which is connected to the server, and a second cellular terminal by which the media object can be retrieved, there being means for determining a parameter which characterizes the geographical location of the first cellular terminal and means for linking the parameter to the media object.

This system can be used to carry out the process as claimed in the invention. Preferably the information platform can be a voice blogging system in which especially voice message can be left by cellular subscribers. The voice blogging system is called this based on the concept of voice-over-IP.

The means for determining the parameter which characterizes the geographical location of the first cellular terminal can be formed for example by a GPS receiver. A GPS receiver can be easily integrated into a cellular terminal so that it can determine its position itself. The terminal is then set up to link the determined position to the media object and to transmit it to the server.

Alternatively the means can also be implemented on the network side and can be set up for implementing a triangulation process, by means of which the geographical position of the cellular terminal can be ascertained by the land mobile network.

BRIEF DESCRIPTION OF THE DRAWING

Other advantages and advantageous embodiments of the invention can be taken from the following description of one illustrated embodiment and the figures. Therein.

DETAILED DESCRIPTION

Figure 1:
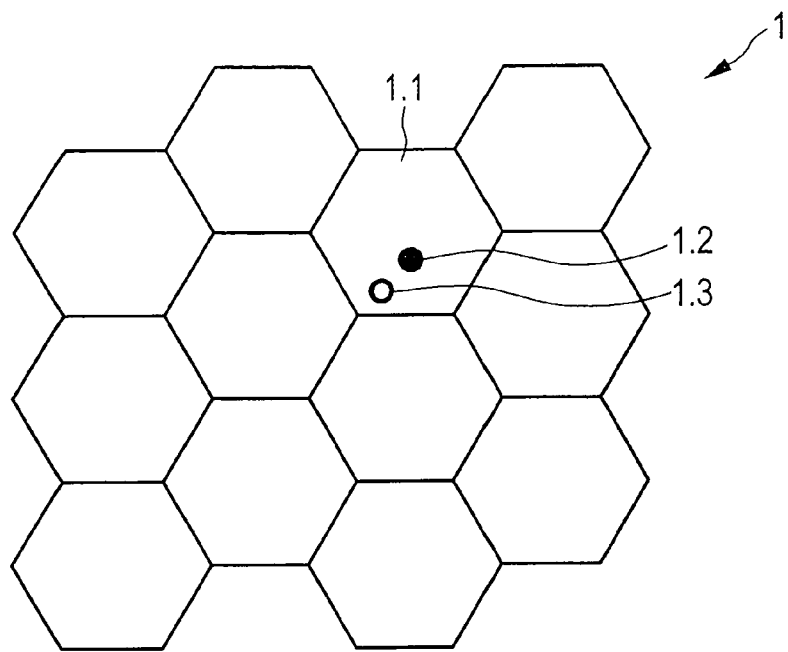
FIG. 1 shows a schematic of a land mobile network with cells and a first and a second cellular terminal.

FIG. 1 shows a cellular land mobile network 1 with several cells, of which one individual cell is labeled by way of example with reference number 1.1. In this cell 1.1 is a first cellular subscriber with a first cellular terminal 1.2 and a second cellular subscriber with a second cellular terminal 1.3, the cellular terminals being set up for communication over the land mobile network.

The system described below makes it possible to implement a voice blogging system in which local communities are automatically set up. For this purpose the location of the cell 1.1 used is evaluated. This evaluation can take place for example by the so-called location-based service (LBS). The invention links the LBS to the voice blogging system so that a location-based service voice blogging system (LBS-VBS) is implemented.

Figure 2:
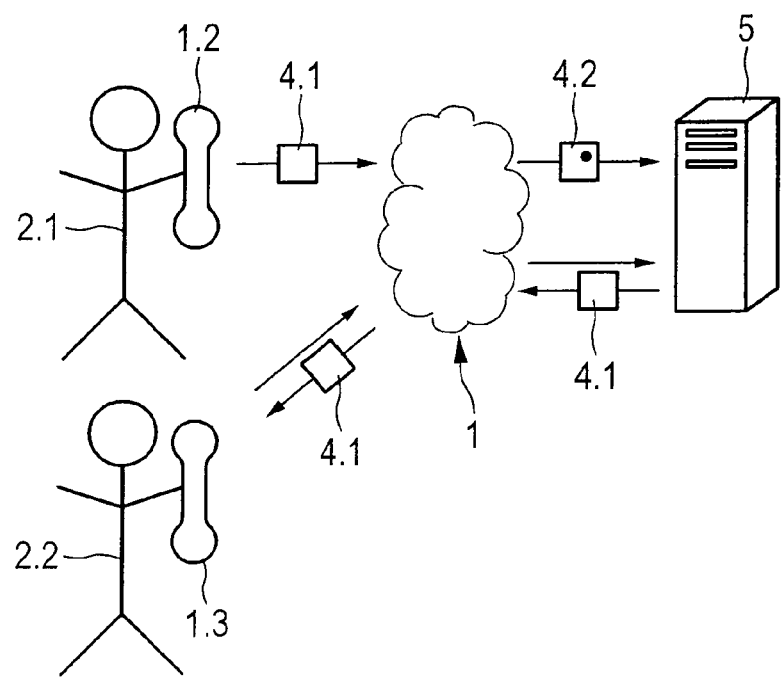
FIG. 2 shows the process steps for transmission of media objects to and from the information platform as claimed in the invention.

In the following embodiment it is distinguished between 2 different cellular subscribers. FIG. 2 shows a first cellular subscriber 2.1 with a cellular terminal 1.2. The latter is geographically located in the cell 1.1 and sends a media object 4.1 to a server 5, on which the voice blogging system is operated. The media object 4.1 is transmitted by way of the land mobile network 1. It determines the geographical location of the cellular terminal 1.2 and links the media object 4.1 to this position. Then the media object 4.2 which is linked in this way is sent to the server 5. Alternatively the geographical position of the cellular terminal 1.2 can be transmitted by the cellular land mobile network even independently of the media object to the server 5, linking of the media object 4.1 to this geographical information being undertaken only on the server 5 by the voice blogging system.

If at this point a second cellular subscriber 2.2 with his cellular terminal 1.3 calls the server 5 by dialing a certain subscriber number, the corresponding connection to the server 5 is established over the land mobile network 1. The cellular subscriber 2.2 can now access the stored media object 4.2 over the voice blogging system. It can be provided that the geographical position of the second cellular terminal 1.3 is likewise determined by the land mobile network 1 and sent to the server 5, the media object then being made available to the second cellular subscriber 2.2 only when his geographical position is in the vicinity of the information linked to the media object. In FIG. 1 this is the cell 1.1 within which both the first cellular terminal 1.2 and also the second cellular terminal 1.3 are located. Thereupon the server 5 sends the media object 4.1 over the land mobile network 1 to the second cellular terminal 1.3 so that the second cellular subscriber 2.2 can view or listen to the media object 4.1.

The process as claimed in the invention is described below using three scenarios.

In the first scenario the first cellular subscriber is an active blogger 2.1. The latter must first be administered on the information platform. This can take place for example over the Internet over which the information platform can be reached. For administration he must provide several data. The data are preferably anonymous except for the self-dialed user names and other information which can be optionally given. The active blogger 2.1 is free to indicate whether these data are to be announced to other bloggers as well. But for administration it is necessary in any case that the active blogger 2.1 gives the cellular subscriber number (MSISDN) of his cellular terminal 1.2 since this is required for assignment to the user name. The MSISDN is anonymous in the normal case if the active blogger 2.1 would not like to disclose it to passive bloggers. In this way it is ensured that the active blogger 2.1 is not unintentionally recognized by third parties.

After the active blogger 2.1 has been administered over a web portal at the information platform, he can leave media objects 4.1 at any locations, especially in the form of voice messages in the location-based service voice blogging system (LBS-VBS) which is being operated on the server 5. For this purpose he calls a subscriber number which is accessible to all active bloggers. This subscriber number can be an abbreviated dial number of the land mobile network 1. The voice message of the active blogger 2.1 is linked by the LBS-VBS to the geographical coordinates of the cell 1.1 and stored.

In a second scenario, a passive blogger 2.2 can use the information platform without logging-on. To do this he calls the subscriber number assigned to the server 5 at any location and can then listen to voice messages of active bloggers which have been recorded for this location. Navigation within the LBS-VBS takes place via DTMF button tones. The passive blogger 2.2 can for example select the user names of active bloggers, can interrogate voice messages (voice blogs), jump between media objects 4.1, have them repeated, search by days, etc.

In the third scenario the passive blogger 2.2 additionally has the opportunity to reach an information platform also over an Internet portal and to interrogate messages of active bloggers 2.1 to which he has already listened on a mobile basis. Alternatively he can also retrieve other messages or other media objects using a digital map. The messages are displayed on this digital map as icons and are played when selected. Logging-on takes place according to the described first scenario. It can take place optionally or can be prescribed by the information platform as mandatory. In the described scenarios the passive bloggers on the information platform can search for voice blogs which lie within a circumference which can be defined by it around their current position. Furthermore, they can search for voice blogs of certain users. Furthermore, it can be provided that if active bloggers in their administration have given certain identifiers which are visible to passive users, the passive bloggers have the opportunity to search for voice blogs of users with the corresponding identifiers on the information platform.

The media objects are preferably voice messages which are transmitted by the active bloggers to the information platform. In particular, for the cellular terminals which have recording of pictures or video, media objects with video data or image data can be send by active bloggers to the information platform. In this way the information platform can be made varied, can be filled and can make available information of the most varied type. Furthermore, especially a passive blogger can be automatically called as soon as he is within a predetermined circumference around a geographic position to which the media object stored on the information platform is linked. The information platform which is made as a voice blogging system offers manifold application possibilities and enables cellular subscribers to form local communities within which location-based information can be easily made available to the community, promptly, directly and comfortably.

The invention claimed is:

1. A process for operating a blogging system on a server connected to a cellular land mobile network from a first cellular terminal over the land mobile network where a media object for the blogging system is transmitted to the server and stored in a database connected to the server and the media object can be retrieved from a second cellular terminal,
   the method comprising the steps of:
   determining a first parameter characterizing the geographical location of the first cellular terminal;
   linking the first parameter to the media object; and
   determining a second parameter characterizing the geographical location of the second cellular terminal;
   comparing the second parameter to the first parameter; and
   making the media object available to the second cellular terminal only when the geographical position of the first cellular terminal as characterized by the first parameter does not exceed a certain distance from the geographical location of the second cellular terminal as characterized by the second parameter.

2. The process defined in claim 1, wherein the cellular terminals are connected to the server by dialing a subscriber number assigned to the server.

3. The process defined in claim 1, wherein after dialing the server an identity interrogation takes place that can be confirmed by the input of a user identifier.

4. The process defined in claim 1, wherein VoiP is used for transmission of the media object.

5. The process defined in claim 1, wherein determination of the geographical location of the second cellular terminal takes place when the second cellular terminal connects to the server.

6. The process defined in claim 1, wherein the geographical location of the second cellular terminal is continuously determined, especially at regular intervals, a media object being automatically offered to the second cellular terminal when the distance between the geographical location of the second cellular terminal and the geographical position that is characterized by the parameter linked to the media object corresponds to a predetermined value or falls below it.

7. The process defined in claim 6, wherein the second cellular terminal is called when the distance between the location of the second cellular terminal and the geographical position that is characterized by the parameter linked to the media object corresponds to a predetermined value or falls below it.

8. The process defined in claim 1, wherein the parameters are identifiers of a cell.

9. The process defined in claim 1, wherein the parameters are geographical longitude and latitude information.

10. The process defined in claim 1, wherein a certain media object is selected by the second cellular terminal and is transmitted by the server to the second cellular terminal.

11. The process defined in claim 1, wherein the media objects are voice messages that are transmitted by the first cellular terminal to the server and that the blogging system is controlled such that the server is controlled by a DTMF process and is caused to execute a certain action by actuation of a button of one of the cellular terminals.

* * * * *